(12) United States Patent
Malin et al.

(10) Patent No.: US 6,634,398 B1
(45) Date of Patent: Oct. 21, 2003

(54) CHIP RESISTANCE TIRE

(75) Inventors: Jerry Malin, Akron, OH (US); Subhash Chander Agarwal, Akron, OH (US); Michael John Roon, Uniontown, OH (US); Dale Eugene Wells, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/296,832

(22) Filed: Apr. 22, 1999

(51) Int. Cl.$^7$ .............................. B60C 9/20; B60C 9/18
(52) U.S. Cl. ..................... 152/527; 152/526; 152/534; 152/535; 152/536; 152/537
(58) Field of Search ................................ 152/527, 534, 152/526, 535, 536, 537

(56) References Cited

U.S. PATENT DOCUMENTS 4,421,899 A * 12/1983 Yamazaki et al. ...... 152/537 X
5,743,975 A * 4/1998 Sinopoli et al. ........ 152/534 X

FOREIGN PATENT DOCUMENTS

EP            0 733 496 A1 * 9/1996 ................. 152/527

* cited by examiner

*Primary Examiner*—Adrienne C. Johnstone
(74) *Attorney, Agent, or Firm*—David E. Wheeler; Nancy T. Krawczyk

(57) ABSTRACT

A chip resistant pneumatic tire (10) is provided. The tire has an original reinforced rubber sheet (22, 22b) embedded in or under its tread (18) and/or sidewall (20), and is used in off the road applications such as mining. Low sulfur rubber (17) is used to coat the organic reinforcement (11), and its shown that such rubber (17) is more compatible with rubber used to form the tread (18) or sidewall (20), which together with the organic reinforcement (11), helps prevent chipping and chunking in the tread (18) and sidewall (20). The illustrated organic filaments of cords (11) have a round cross section and are at least 2000 denier (2200 dTex) and have a tenacity of at least 3.5 g/denier (31 cN/Tex), an initial modulus of at least 20 g/denier (177 cN/Tex), an elongation at break of at least 10%, and a shrinkage of at most 10%.

7 Claims, 3 Drawing Sheets

CHIP RESISTANCE TIRE

TECHNICAL FIELD

The invention relates to chip resistant pneumatic tires, especially off-the-road (OTR) tires and heavy duty off-the-road tires having typically 1 to 36 carcass plies and 6 belts (in a radial ply tire) or 4 breakers (in a bias ply tire), and one to four sets of beads.

BACKGROUND ART

Heavy-duty off-the-road tires, because of the nature of their use, are exposed to chipping and chunking caused by sharp rocks and uneven terrain. A number of means have been used in the prior art to confront this problem with varying degrees of success.

U.S. Pat. No. 5,173,136 issued Dec. 22, 1992, teaches incorporating RFL coated monofilament fibers into the tread rubber and sidewall rubber of mining tires.

U.S. Pat. No. 5,490,550 teaches the use of continuous wire filaments incorporated as a barrier in the tread and/or sidewall of off-the-road tires.

Experience has shown that a well-constructed steel reinforced OTR tire is more durable than those made with organic reinforcement.

A high sulfur rubber is used to coat steel reinforcement to improve adhesion between rubber and steel. Although generally cut resistant and durable, the inventors have observed more chipping and chunking in the tread of steel reinforced tires than is seen in less rigid tires. In the conception of the invention, the inventors theorized that if a rubber having high compatibility with tread rubber is used as a barrier between the tread and steel reinforcement, such compatibility might better distribute forces on the tread to a larger portion of the tire, and help prevent chipping and chunking. Additional reinforcement in the rubber may further enhance such a force distribution.

Low sulfur rubber is used in reinforced plies incorporating nylon reinforcement, and such rubber tends to be more resilient.

Organic monofilament reinforcement has been used in the past as a barrier ply in truck tires as shown in U.S. Pat. No. 5,743,975, which teaches the use of nylon monofilament top belts in radial medium truck tires. Such monofilament reinforcement has been used to minimize cutting of the tread and increase retreadability in RMT tires.

It is an object of the present invention to provide a chip resistant tire.

Other objects of the invention will be apparent from the following specification and claims.

PRIOR ART

U.S. Pat. No. 1,201,257 to Cobb relates to a fabric for tires in which longitudinal wire cords or filaments are interwoven with organic fibers. The structure described is used in a crown area of the tire as a belt structure.

U.S. Pat. No. 1,207,709 to Campbell relates to fabric for tires in which wire is interwoven with organic cords or fibers in a wire/organic composite structure.

U.S. Pat. No. 1,228,650 to Christian relates to a pneumatic tire in which a woven wire fabric is used in the crown area and upper sidewall of the tire. The woven wire structure is said to provide resistance against perforation, lines 17–18, and blowouts resulting from high internal pneumatic pressure, and from injury termed "stone bruise", lines 27–30.

U.S. Pat. No. 2,987,095 to Toulmin, Jr. relates to a tire cord structure and describes a tire wherein reinforcing metal is incorporated and thoroughly united with the rubber in the body of the casing. The individual strands may be woven to provide a fabric structure or interwoven middle layer, column 2, lines 43–45.

U.S. Pat. No. 4,235,274 to Suzuki et al, relates to a tire structure having a reinforcing layer composed of a helically formed filament or bundle of wire in the crown area of the tire. According to the claims, the bundle comprises at least two filaments and in use in a tire, it appears that five to seven filaments comprise the bundle used.

SUMMARY OF THE INVENTION

A chip resistant pneumatic tire 10 is provided which comprises at least a pair of parallel annular beads 12, carcass plies 14 comprising parallel cord reinforcement wrapped around the beads, a tread 18 disposed over the carcass plies 14 in a crown area of the tire 10, belt or breaker reinforcement 16 interposed between the tread 18 and carcass 14, and sidewalls 20 disposed over the carcass plies 14 between the tread 18 and the beads 12. The tires 10 may be bias ply or radial ply construction.

The improvement in the tire comprises the inclusion of plies comprising continuous organic reinforcement in a rubber reinforced rubber sheet 22,22b in or under the tread and/or sidewall. The reinforcement may be monofilaments or cords 11. Two organic monofilaments 11 may be used together.

The cords or filaments used in the reinforced rubber sheet 22,22b are at least 2000 denier (2200 dTex) and have a tenacity of at least 3.5 g/denier (31 cN/Tex), an initial modulus of at least 20 g/denier (177 cN/Tex), an elongation at break of at least 10% and a shrinkage of at most 10%.

In an illustrated embodiment, reinforced rubber sheet 22, wherein the reinforcement therein makes an angle of 50° to 70° with respect to the EP of the tire, is placed over the belt package 16 of a tire 10.

In the illustrated embodiment, 9000 denier (10,000 dTex) round monofilaments having a tenacity of 37 cN/Tex and an initial modulus (greige) of 194 cN/tex were used as reinforcement in an reinforced rubber sheet 22 used to build a tire 10 of the invention.

In a specific illustrated embodiment of the invention, the reinforced rubber sheet 22 is a nylon monofilament reinforced ply wherein the reinforcement cords 11 have an angle of 60° with respect to the equatorial plane (EP) of the tire. In such constructions, an organic monofilament reinforced ply is used as an overlay/top breaker wherein the ply does or does not extend beyond the edges of the other breakers, and the angles of the reinforcing cords are maintained in substantially the same direction as the steel reinforcement cords in the breaker ply next radially below, or are at directions which cross said steel reinforcement cords.

DEFINITIONS

As used herein and in the claims, the terms

"Axial" and "axially" refer to directions which are parallel to the axis of rotation of a tire, "Radial" and "radially" refer to directions that are perpendicular to the axis of rotation of a tire, "Bead" refers to that part of a tire comprising an annular tensile member wrapped by ply cords and shaped, with or without other reinforcement elements to fit a designed tire rim, "Carcass" refers to the tire structure apart from the belt structure, tread, undertread, and sidewall rubber but including the beads, (carcass plies are wrapped around the beads), "Belt" or "belt ply" refers to an annular layer or ply of parallel cords, woven or unwoven, underlying the tread, not anchored to the bead, and having cord angles of from 12° to 35° with respect to the EP of the tire, "Breaker plies" refers to annular reinforcement members in the crown area of a bias ply tire having longitudinal reinforcement members having an angle (in the illustrated embodiment) with respect to the equatorial plane of the tire, "Crown" refers to substantially the outer circumference of a tire where the tread is disposed, "Lase" refers to load at specified elongation.

"Equatorial plane (EP)" refers to a plane that is perpendicular to the axis of rotation of a tire and passes through the center of the tire's tread, "Obround" refers to a cross sectional shape having a width greater than its height and having no sharp corners (e.g. oval), and generically is intended to include similar rounded shapes, "Rivet" refers to the amount of space between two adjacent cords, "Tenacity" refers to breaking stress expressed as force per unit linear density of an unstrained specimen (cN/Tex or gm/denier), (usually used in textiles), "Modulus" refers to the ratio of the change in stress to the change in strain, and "Organic" refers to compounds, including polymers, containing a carbon backbone or structure, which can be shaped, stretched of formed into a particular physical configuration.

DETAILED DESCRIPTION OF THE INVENTION

Figure 1:
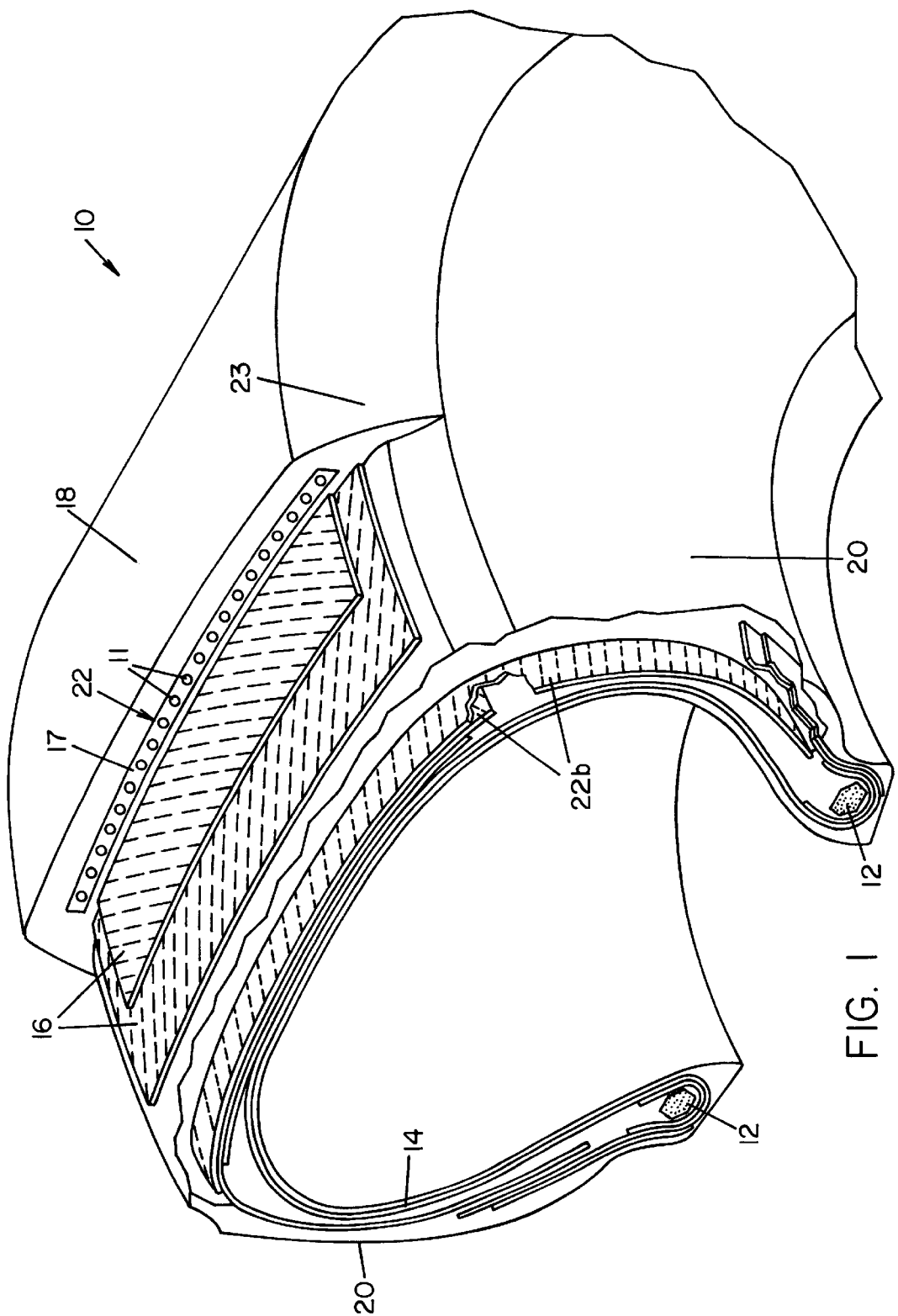
FIG. 1 illustrates a heavy-duty off-the-road radial tire having an organic reinforced reinforced rubber sheet structure.
Figure 2:
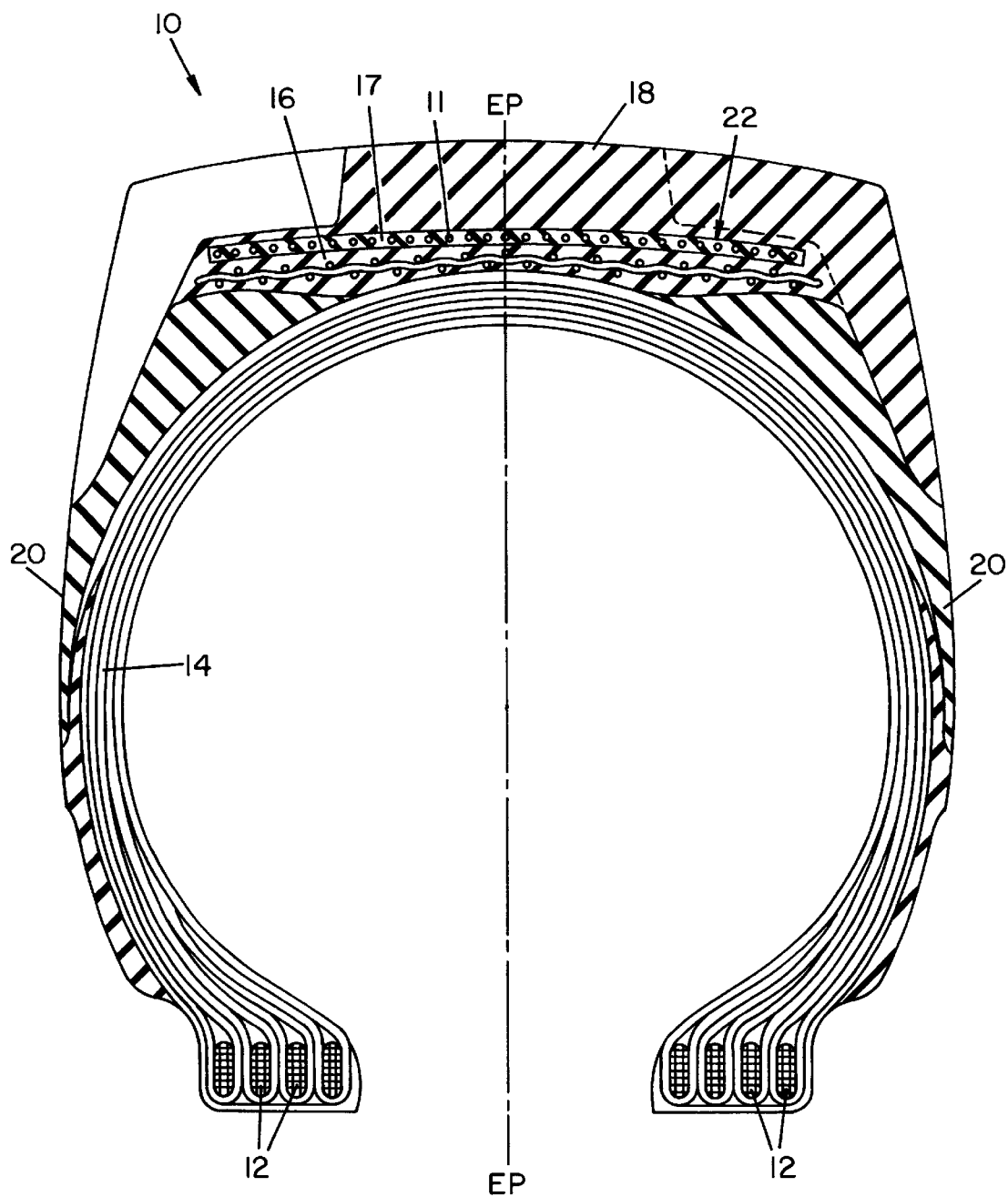
FIG. 2 illustrates a cross section of a bias ply tire having organic monofilament reinforcement embedded therein.

With reference now to FIGS. 1–2, embodiments of a heavy duty, off-the-road tire 10 of the invention are illustrated. The tire comprises beads 12, carcass plies 14 wrapped around beads 12, belt or breaker reinforcement 16 disposed over carcass plies 14 in a crown area of tire 10, tread 18 disposed over belt or breaker reinforcement 16, and sidewalls 20 disposed between the tread and beads 12. Organic filament reinforcement in reinforced rubber sheet 22 is embedded in or under the tread and/or the sidewall 20. FIG. 1 represents a radial tire having one set of beads, and FIG. 2 represents a bias ply tire having four sets of beads.

The tire, in general, may be constructed similar to those described in U.S. Pat. Nos. 5,173,136 and 5,490,550 which are incorporated herein by reference, or similar to tires described in references cited therein. Such tires, in general, have a bead diameter of 15 to 57 inches and a net-to-gross of 15 to 100%, an aspect ratio of 0.75 to 1.0, and a load capacity of 1000 to 300,000 kg.

The elastomeric composites used in the tire, including the carcass plies and belts or breakers, as is common in the art, are reinforced with substantially parallel longitudinal reinforcing members. The present invention relates specifically to pneumatic tires 10 which have reinforced rubber sheet 22,22b which are reinforced by organic cords or filaments 11. In the illustrated embodiment, the reinforced rubber sheet 22,22b is an added component, and is used in addition to conventional reinforcement used in these types of tires. The organic reinforcement is embedded in a low sulfur rubber 17. By low sulfur rubber, it is meant that sulfur is present in the rubber composition at a level of at most 7 phr (parts by weight per hundred parts by weight rubber) (maximum range 0–7 phr), preferably in the range of 2 to 3 phr.

The rubber ordinarily used in such calendered reinforcement plies is natural rubber, and natural rubber is used in the organic reinforced components used in the illustrated embodiment of the invention.

Although it is believed that large diameter organic cords would be suitable for reinforcing a reinforced rubber sheet 22,22b it was decided to test large diameter, nylon 66 monofilaments for such purpose. Monofilaments of obround and similar structure have been used in radial ply tires as described in U.S. Pat. No. 4,850,412 issued to Gupta, Jul. 25, 1989.

Round monofilaments have advantages over flat or obround monofilaments in that a greater rivet between the cords is possible, providing better compound links with an adjacent tread rubber or other tire component.

The greater rivit, the monofilaments, better adhesion between the tread rubber and the low sulfur rubber used to surround the nylon monofilaments, and the better resiliency of the low sulfur rubber, and possibly a reduced tread gauge, are believed to work together to provide a more chip resistant tire.

The tread thickness represents 50% to 90% of the thickness of the tire in the crown region at the EP of the tire. If the reduction of the tread guage contributes significantly to the properties obtained, a tread thickness of 50% to 75% of the thickness of the tire at the EP will be preferred.

As noted above, the tread rubber used in making the tire of the invention is the conventional tread rubber used in making these types of tires. Also, the low sulfur rubber used to encapsulate the organic reinforcement is the conventional rubber used to encapsulate organic reinforcement in a tire.

A reinforced rubber sheet 22,22b having round monofilament reinforcement 11 having a linear density of 9000 denier (10000 dTex) and a tenacity of 37 cN/Tex and an initial modulus (greige) of 194 cN/tex as reinforcement is illustrated.

The organic polymer reinforcement 11 used in the reinforced rubber sheet of an OTR tire reduces chipping and chunking of the tread. In addition, the organic polymer reinforced rubber sheet 22 helps prevent belt and breaker damage by improving the penetration resistance of the tire.

With reference again to FIGS. 1 and 2, in the illustrated embodiments organic reinforcement is encased in low sulfur rubber 17 and is disposed between tread 18 and belt structure 16 in reenforced rubber sheet 22.

Those skilled in the art will recognize that the reinforced rubber sheet material may be extended into the sidewalls of the tires down to the bead area of the tire. Such a structure is illustrated for steel reinforcement in U.S. Pat. No. 5,386,860, incorporated herein by reference. FIG. 1 illustrates an optional reinforced rubber sheet 22b disposed over carcass ply 14 which is adapted to provide such protection in the sidewall area of the tire 10.

Figure 3:
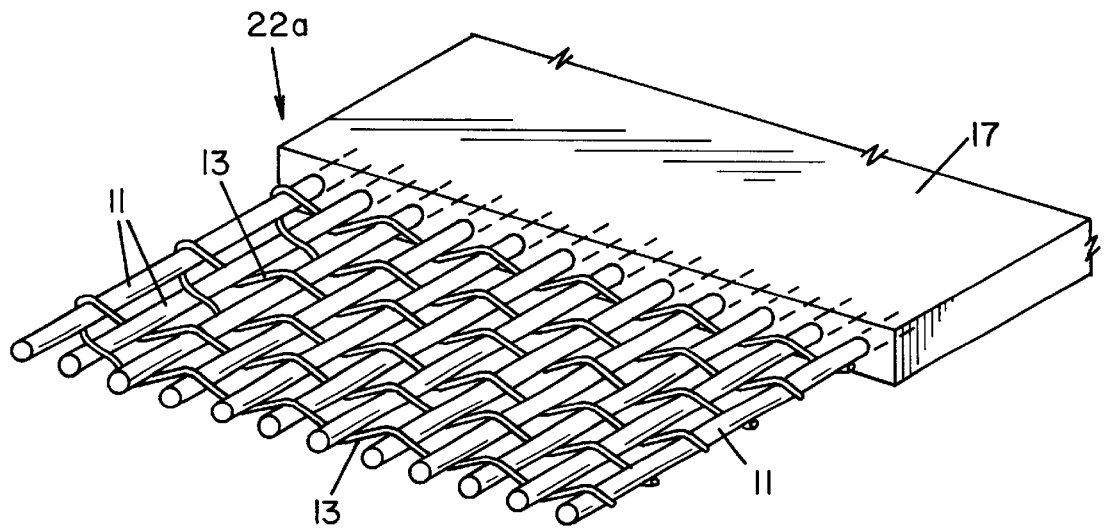
FIG. 3 illustrates individual monofilaments embedded in rubber.
Figure 4:
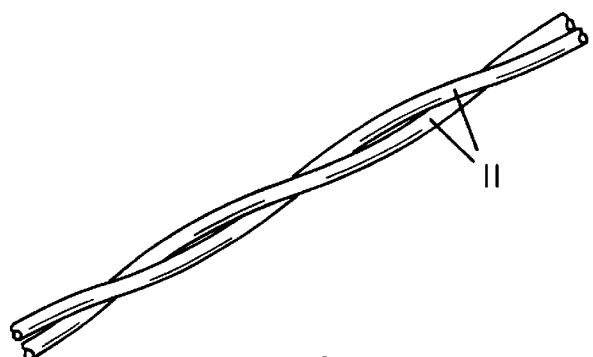
FIG. 4 illustrates two monofilaments twisted together.

With reference to FIG. 3, the monofilament may be calendered so that the monofilaments 11 are embedded in a layer of rubber 17, independent of one another, or two monofilaments 11 can be twisted together, with a 12 to 25 mm lay length as illustrated in FIG. 4.

In a radial ply tire 10, calendered rubber sheets 22a containing parallel monofilaments 11, as illustrated in FIG. 3, may cover the carcass plies 14 from bead to bead. In the illustrated embodiment of FIG. 1, a first calendered rubber sheet 22b extends from a first bead 12 over a first sidewall 20 and a first shoulder 23 of the tire across the crown of the tire to a second shoulder of the tire, and a second calendered sheet 22b extends from a second bead 12 over a second sidewall 20 and said second shoulder and across the crown to said first shoulder 23 of said tire.

The tires 10 of the invention may be built as is conventional in the art except that the organic reinforced rubber sheet, for example structure 22 or structure 22b, as an additional component, can be rolled onto the tire in the same manner as a belt ply.

With reference again to FIG. 3, monofilaments 11 may be held in relationship to one another by pick filaments 13 to form calendered rubber sheets 22a for their incorporation in an elastomeric material.

Those skilled in the art will recognize that materials having greater strength and elongation properties could improve the performance of any tire made therewith. It is believed that the parameters described herein, together with resistance to chemicals, heat and humidity, represent the minimum physical requirements of a monofilament reinforcement material used to make tires in accordance with the present invention.

The maximum tenacity for the round nylon material is estimated to be about 11.3 g/denier (100 cN/tex), the maximum initial modulus is estimated to be about 55 g/denier (485 cN/tex), and the maximum elongation at break is estimated to be about 32%.

Material suitable for use in the invention may have a tenacity of 3–11.3 g/denier (27–100 cN/tex), an initial modulus of 20–55 g/denier (177–485 cN/tex) and an elongation at break of 10–40%.

Monofilaments of nylon, particularly well suited for implementing the invention are those described by Shakespeare Monofilament Division, Columbia, S.C., under the trade name WN125.

The organic textile reinforcing elements used as an a reinforced rubber sheet over the top belt or breaker ply can each comprise a monofilament of at least 1,800 denier (2,000 dTex), for example 1,800 denier to 18,000 denier (2,000–20,000 dTex), preferably between about 6,000 and 13,500 denier (6,700 and 15,000 dTex) nylon. A monofilament is by definition a cord consisting of one filament. When using monofilaments of 6000 denier and up, the monofilaments in each ply are disposed with a density of 4 to 18 EPI (ends per inch), preferably 10 to 16 EPI in order to yield the desired mechanical characteristics of the tire.

Tires have been manufactured according to an illustrated embodiment using round 10,000 dTex dipped nylon monofilaments (i.e. resorcinol formaldehyde latex (RFL) coated) having the following approximate characteristics:

| | |
|---|---|
| diameter: | 1 mm |
| tenacity: | 44.5 cN/Tex |
| lase: | 171.0 N @ 7% elongation |
| elongation at break: | 22% |
| Shrinkage: | 5.3% |

In an alternative embodiment, the organic polymer reinforcement may be coated with an epoxy subcoat before application of the RFL adhesive.

The different strength measurements were made using a standard tensile tester, and the shrinkage measurement was made using a Testrite shrinkage tester. Tires made using reinforced rubber sheet having nylon 66 monofilament reinforcing members demonstrate increased tire endurance and durability.

If different diameter monofilaments are used, different end counts may be used, and it is believed that tires of the invention can be made using organic monofilament reinforced rubber sheet having end counts of 10 to 22 epi. Such tires may have steel belts having parallel reinforcement at 4 to 16 ends per inch.

The invention is further illustrated with reference to the following examples.

EXAMPLE 1

Twelve tires were prepared in the conventional manner except that an additional reinforced rubber sheet comprising organic monofilament reinforced low sulfur rubber was placed over the belt package. The specific tires built were radial ply tires having 6 belts having reinforcement disposed at opposing angles of about 22° (those skilled in the art recognize that pantographing in the construction of the tire causes the belt angles to vary between 18° and 24°) with respect to the EP of the tire in the belt package in alternate belts. The second belt in the belt package is the widest, and belts 3, 4, 5 and 6 are each slightly less wide than the adjacent belt radially below. The first two belts were made with wire reinforcement having a gauge of 0.290 cm (0.114 inch) and an end count of 5.5 e.p.i. The third and fourth belts used 0.320 cm (0.126 inch) gauge wire reinforcement at 5.5 e.p.i., and the fifth and sixth belts used 0.180 cm (0.071 inch) gauge wire reinforcement at 7.3 e.p.i. The treatment gauge of the belts was conventional for 6 belt radial ply tires of this type, and the total gauge treatment of the six belts was 28.24 cm (1.112 inch). The reinforced rubber sheet was constructed to have the same width as the top belt and was reinforced with 10000 dTex round nylon 6, 6 monofilaments at 15 e.p.i. The treatment gauge of the reinforced rubber sheet was 0.175 cm (0.069 inch). Since the gauge of the carcass plies was 0.638 cm (0.251 inch), the total thickness of the carcass plus the reinforcement package was 3.462 cm (1.363 inch).

Since the reinforced rubber sheet is an added component to this radial tire construction, the treads gauge was reduced by 0.175 cm (0.069 inch) to compensate for the added gauge of the reinforced rubber sheet. The gauge of the tread was 10.9 cm (4.291 inch).

The tread comprised 75% of the thickness of the tire at its EP, as compared to 75.1% of the thickness of a conventionally made tire without a reinforced rubber sheet.

The reinforced rubber sheet was applied to the tire so that the reinforcement made an angle of 60° with respect to the EP of the tire.

The tires illustrated in this example have an aspect ratio of 94 to 97, a load capacity of 38,636 to 60,454 kg. (85,000 133,000 lbs), and a net to gross ratio of 72% to 73%.

The tires were placed at the Morenci mine in Montana for testing. Preliminary results obtained November, 1998, are shown in Table I below

TABLE I 10,000 DTEX, 15 EPI ROUND MONOFILAMENT reinforced rubber sheet

| | OTR TIRES | |
|---|---|---|
| | CONTROL | OVERLAY |
| TIRE SIZE | 40.00R57 | 40.00R57 RL4H 2H |
| PROD DATE | OCT/96/–JAN97 | MAR–APR'97 |
| TIRES REMOVED | 20 | 12 |
| AVG MILES | 11645 | 15190 |
| % WORN | 42.2 | 42.2 |
| PLY SPLITS | 11 AT 14231 | 6 AT 7158 |
| CUTS SHLDR | 4 AT 8404 | 2 AT 10700 |
| LINER SEP | 1 AT 11396 | 1 AT 17515 |
| CUTS SW | 1 AT 7839 | 1 AT 11268 |
| CUTS TREAD | 2 AT 4522 | 2 AT 14573 |
| TURN UP SEP | 1 AT 14468 | — |

The size 40.00R57 tires have an aspect ratio of 95.4, a load capacity of 60,227 kg.(132,500 lbs), and a net to gross of 72.4%.

EXAMPLE 2

Additional tires of a different size were placed for obtaining data under different conditions. The same belt construction and tread guages described in example 1 were used to build the tires. The test data for the tires is shown in Table II below.

The size 33.00R51 tires have an aspect ratio of 96.4, a load capacity of 38,864 kgs. (85,500 lbs), and a net to gross of 72.4%. The size 37.00R57 tires have an aspect ratio of 94.6, a load capacity of 51,591 kgs. (113,500 lbs), and a net to gross of 72.6%.

TABLE II

REINFORCED RUBBER SHEET TIRES FIELD PERFORMANCE UPDATE FOR TIRES AT CMC

| TYPE | # TIRES | % WORN | ALL IN HRS | # WORN OUT | W/O HRS | PROJ HRS |
|---|---|---|---|---|---|---|
| 3300R51 ON CAT785 COAL HAULERS | | | | | | |
| P7 REINFORCED RUBBER SHEET | 4 | 78% | 4224 | 3 | 4579 | 5515 |
| ALL GDYR | 31 | 69% | 3535 | 15 | 4640 | 5266 |
| COMPETITOR | 3 | 87% | 4172 | 3 | 4172 | 4794 |
| 3300R51 ON CAT 785 ROCK HAULERS | | | | | | |
| P7 REINFORCED RUBBER SHEET | 4 | 82% | 4829 | 3 | 5268 | 5881 |
| ALL GDYR | 23 | 79% | 4219 | 16 | 4536 | 5416 |
| COMPETITOR | 5 | 90% | 4137 | 4 | 4187 | 4580 |

TABLE II-continued

REINFORCED RUBBER SHEET TIRES FIELD PERFORMANCE UPDATE FOR TIRES AT CMC

| TYPE | # TIRES | % WORN | ALL IN HRS | # WORN OUT | W/O HRS | PROJ HRS |
|---|---|---|---|---|---|---|
| P7OVERLAY: 3300R51 RL4HII 4H MONOFILAMENT NYLON OVERLAY | | | | | | |
| 3700R57 ON DRESSER 685E | | | | | | |
| 03 REINFORCED RUBBER SHEET | 12 | 85% | 5629 | 5 | 5379 | 6662 |
| ALL GDYR | 52 | 78% | 4831 | 28 | 4993 | 6200 |
| COMPETITOR | 11 | 93% | 5872 | 10 | 5848 | 6304 |
| 03 OVERLAY - 3700R57 RL4HII 3HR 1890/3 NYLON OVERLAY | | | | | | |

Montana Tunnels & Resources Field Survey Results

Montana Tunnels

The 3300R51 P6 reinforced rubber sheet tires out performed the competitor control All In Avg (7567 hrs vs a reported 5000–6000 hrs). Overlay tire Wear Outs averaged 7611 hrs while competitor tires were reported to average in the 6000–7000 hr range.

Results of data obtained March, 1999, shown in Table II illustrate results under different conditions (coal haulers, rock haulers and dressers). Again, projected hours of wear of tires of the invention show a significant increase over projected hours of wear of a competitor control tire.

While the invention has been specifically illustrated and described, those skilled in the art will recognize that the invention may be variously modified and practiced without departing from the spirit of the invention. The scope of the invention is limited only by the following claims.

What is claimed is:

1. A pneumatic tire (10) comprising at least a pair of parallel annular beads (12), carcass plies (14) wrapped around said beads (12), steel belts or breakers (16) comprising steel cords coated in high sulfur rubber disposed over said carcass plies (14) in a crown area of the tire (10), tread (18) disposed over said steel belts or breakers (16), and sidewalls (20) disposed between said tread (18) and said beads (12), the improvement wherein a reinforced rubber sheet (22) comprising low sulfur rubber (17) reinforced with round organic filaments or cords (11) is disposed over said steel belts or breakers (16), the steel cords in the steel belts or breakers (16) being inclined at angles of 12° to 35° with respect to the equatorial plane of the tire, and the organic filaments or cords (11) form an angle of 50° to 70° with respect to the equatorial plane of the tire, said organic filaments or cords (11) being at least 2000 denier (2200 dTex) and having a tenacity of at least 3.5 g/denier (31 cN/Tex), an initial modulus of at least 20 g/denier (177 cN/Tex), an elongation at break of at least 10% and a shrinkage of at most 10%.

2. The tire of claim 1 wherein said organic cords or filaments (11) are monofilaments.

3. The tire of claim 2 wherein two to four calendered sheets (22,22b) are used in said tire.

4. The tire of claim 1 wherein said organic reinforced rubber sheet (22) has parallel reinforcement filaments (11) at a concentration of 4 to 18 ends per inch and the steel belts or breakers (16) has steel cords at a concentration of 4 to 16 ends per inch.

5. The tire of claim 1 wherein the organic cords or filaments (11) in the organic polymer reinforced rubber sheet (22) are coated with an epoxy subcoat and a resorcinol formaldehyde latex (RFL) adhesive topcoat.

6. The tire of claim 1 wherein said reinforced rubber sheet (22) is reinforced with round 10,000 dTex nylon 66 monofilaments, wherein said monofilaments have an end count in said reinforced rubber sheet of 10–16 ends per inch.

7. The tire of claim 6 wherein said tire has 6 steel belts (16) and one monofilament reinforced rubber sheet (22) wherein the monofilament reinforcement is treated with an epoxy subcoat and an resorcinol formaldehyde latex (RFL) adhesive topcoat.

* * * * *

UNITED STATES PATENT AND TRADEMARK OFFICE
CERTIFICATE OF CORRECTION

PATENT NO.   : 6,634,398 B1
DATED        : October 21, 2003
INVENTOR(S)  : Jerry Malin et al.

It is certified that error appears in the above-identified patent and that said Letters Patent is hereby corrected as shown below:

<u>Title page, Item [54] and Column 1, line 1,</u>
Delete the Title "CHIP RESISTANCE TIRE" and insert the Title -- CHIP RESISTANT TIRE --

Signed and Sealed this

First Day of June, 2004

JON W. DUDAS
*Acting Director of the United States Patent and Trademark Office*